Feb. 27, 1968

R. R. DILLON 3,370,458

MECHANICAL FORCE GAUGE

Original Filed Aug. 28, 1962

INVENTOR.
RALPH R. DILLON
BY *Elliott & Pastoriza*
ATTORNEYS

United States Patent Office 3,370,458
Patented Feb. 27, 1968

3,370,458
MECHANICAL FORCE GAUGE
Ralph R. Dillon, Van Nuys, Calif., assignor to W. C. Dillon & Company, Inc., a corporation of California
Continuation of abandoned application Ser. No. 219,973, Aug. 28, 1962. This application Sept. 10, 1965, Ser. No. 490,768
2 Claims. (Cl. 73—141)

ABSTRACT OF THE DISCLOSURE

A mechanical force gauge for measuring opposed forces by deformation of parallel arms connected by a loop at one end and freely extending at their other ends. One of the arms includes an integral extension for supporting an indicating instrument having a probe running parallel to the free ends. The other free end member includes an anvil element inclined and engaged by the probe such that lateral movement between the free end members urges the probe in a longitudinal or parallel direction to the end members. The relative distance between the anvil and the probe may be initially adjusted to vary the capacity of the gauge and the angle of the inclination of the anvil member may be adjusted to vary the sensivity of the gauge.

---

This application is a continuation of application Ser. No. 219,973, filed Aug. 28, 1962, and entitled, Mechanical Force Gauge, now abandoned.

This invention generally relates to mechanical type force measuring instruments and more particularly concerns an improved mechanical type force gauge which is particularly designed for measuring opposing forces such as might be exerted, for example, by the opposing electrodes of a spot welding machine.

Although the invention will be described at times, for illustrative purposes, with respect to its application to the electrodes of a welding machine, it is apparent that the invention may be advantageously employed in numerous applications wherever opposing forces are exerted. In fact, the force gauge of the present invention may be uniquely employed on a table or other flat surface for an application in which a single force exerting member is brought downwardly into engagement with the gauge while the table or other stationary surface provides the opposing force. The advantages of the improved force gauge of the present invention with respect to these different applications will be apparent as the specification proceeds.

It is a primary object of the present invention to provide an improved force gauge which readily lends itself to convenient reading of the force measurements, and which is particularly adaptable for convenient packaging and handling.

Another object of the present invention is to provide an improved force gauge which is so designed as to have minimum overall dimensions, and further which is constructed to enable quick and precise adjustments for measuring forces throughout wide ranges.

Another object of the present invention is to provide an improved mechanical force gauge in which several adjustments may conveniently be made with respect to both the capacity and sensitiveness of the gauge.

A still further object of the present invention is to provide an improved mechanical force gauge which employs a minimum number of parts assembled together in a rugged construction, and in which the gauge is substantially maintenance free and designed for a long life.

Still a further object of the present invention is to provide an improved mechanical force gauge which is designed such that it may be positioned on a table or other flat surface and read from above.

Still another object of the present invention is to provide an improved force gauge in which the indicating means as such may be easily removed and shipped or handled separately if necessary, and yet in which the indicating means may be readily reassembled and adjusted with respect to the force measuring member.

These and other objects of the present invention are generally attained by providing a force gauge comprising an integral U-shaped member defining a looped portion and spaced free ends. Force engaging surfaces are provided near the looped portion such that opposing forces may be imposed thereon to cause at least one of the free ends to move laterally relative to the other.

An indicator means is coupled to the unit, and the indicator means includes a probe which has its axis positioned to be substantially parallel to the free ends of the gauge. An anvil is coupled to the one of the free ends which is designed to be responsive to said lateral movement; the anvil imparts an axial movement to the probe of the indicator means.

In a preferred embodiment of the invention, the other of the free ends is provided with an integral extension which is designed to have the indicator means coupled thereto.

A better understanding of the present invention will be had by now referring to an illustrative embodiment thereof as shown in the accompanying drawings, and in which.

Figure 1:
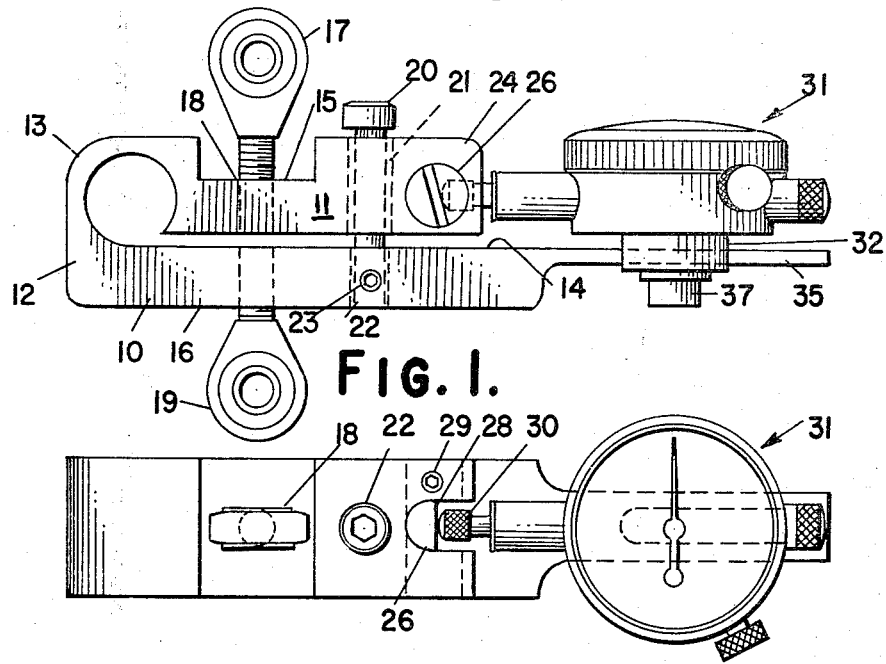
FIGURE 1 is a side elevational view of an improved mechanical force gauge according to the present invention.

Referring now to the drawings, there is shown in FIGURE 1 a force gauge, according to the present invention, embodying a base member 10 having integrally formed therewith an upper member 11. The base member 10 and the upper member 11 are joined together with a looped portion 12 to define a generally U-shaped resilient member designed to pivot approximately about a point 13 of the looped portion 12. A slot 14 is defined between the upper member 11 and the base member 10 enabling the upper member 11 to move towards the base member 10 a limited distance.

The upper member 11 is provided with a recessed area 15 which is designed to receive a force exerting member, for example the electrode of a spot welding machine. Similarly, the bottom face 16 of the base member 10 is designed to receive a force exerting member, for example the other electrode of spot welding machine.

As shown from the view of FIGURE 1, the force gauge construction of the present invention is also adaptable to measuring tensile loads. Thus, there is shown a clevis 17 designed to be received in a tapped opening 18 in the upper member 11. Similarly, another clevis 19 may be threadedly secured to the base member 16 in a tapped hole provided therein. When compression loads are being measured, the clevises 17 and 19 are merely removed and the forces may be imposed directly on the surfaces 15 and 16. If necessary, appropriate plugs may be threaded into the tapped openings when compression loads are used.

For safety purposes, a pin 20 may be provided which fits loosely through a larger diameter opening 21 in the upper member 11, and which threads securely into a tapped hole 22 in the base member 16. A set screw 23 may be provided to laterally extend through the base member 16 and secure the pin 20 therein, wherein a predetermined amount of overload range of travel is permitted.

Figures 3, 4, 5:
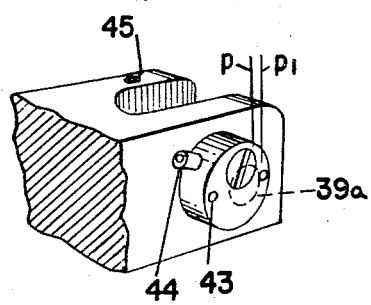
FIGURE 3 is an enlarged perspective view of the interengagement of the indicating means and the anvil means on the force gauge for actuating same.
FIGURE 4 is a view showing the inter-coupling of the indicator means to the force gauge.
FIGURE 5 illustrates a modification to the force gauge of the present invention for varying the capacity thereof.

In accordance with a feature of the present invention, the upper member 11 is bifurcated at its free end to define opposing ears 24 and 25, as more clearly shown in the view of FIGURE 3.

An anvil shaped member 26 is slidingly received in axially aligned openings provided in the opposite ears 24 and 25. The anvil member 26 is provided with a screw slot at one end for rotative adjustment thereof. The anvil member 26 is provided with a cam face 28. The precise rotative position of the anvil member 26 may be adjusted by using a screw driver in the screw slot 27 and thereafter locking the anvil member in position by a set screw 29.

The cam face 28 is designed to cooperate with a probe 30 of a conventional large dial faced indicating instrument 31 in a manner that will become clearer as the specification proceeds.

The indicating instrument 31 is provided on its back portion with a disc-shaped support 32 which is recessed to define arcuate ears 33 and 34 within which is received an integral extension 35 of the base member 10, as more clearly seen in the view of FIGURE 4. In this regard, the extension 35 is provided with a slot 36 through which a screw or pin is designed to extend to be locked by a nut 37. Thus, the nut 37 straddles the slot 36 and tightens the extension 35 against the disc member 32 between the ears 33 and 34. By merely loosening the nut 37, the indicating instrument 31 may be slid up and down along the slot 36 to any desired position to vary the capacity of the unit.

The operation of the improved mechanical force gauge of the present invention may now be described. It will be apparent that by exerting either a tensile or compression force against the members 10 and 11—that is, the force engaging surfaces 15 and 16 thereof—a corresponding movement of the members 10 and 11 will occur relative to each other at the free ends thereof whereby the anvil member 26 will move upwardly or downwardly. Thus, with the clevises 17 and 19 employed, the free end of the member 11 will tend to be drawn away from the free end of the member 10. By adjustment of the anvil 26 to a proper position, for example at the angle of the screw slot shown in FIGURE 1, the probe 30 of the indicator 31 will be forced away from the cam face 28 to yield a proportionate force reading. On the other hand, if the anvil 26 is in the rotative position as shown in FIGURE 3, compression loads will tend to force the probe 30 towards the dial face of the indicating means 31 to give an indication of the force being applied. Thus, by a simple screw driver adjustment of the anvil 26, the gauge may be changed to read either tensile or compression loads. Of course, the clevises 17 and 19 must be threaded or removed as required.

Under compression, the actual depth of the slot 14 will limit movement of the upper member 11 towards the base member 10. Under tension loads, for example using the clevises 17 and 19 as shown in FIGURE 1, the overload pin 20 will limit the movement of the upper member 11 away from the base member 10.

The sensitivity of the force gauge may be quickly varied by adjusting the anvil member 26 such that the cam face 28 thereof is at a slightly less or greater angle and by thereafter resetting the set screw 29 in the manner as heretofore stated. In addition, the capacity may be varied by changing the position of the indicating member 31 along the slot 36 of the extension 35 of the base member 11. Of course, conventional adjustments may be made in the zero position of the dial indicator in a manner well known in the art.

It should also be noted that the anvil face 28 travels in a slight arc and that the cooperation between the face 28 and the probe 30 effects a motion correcting for the arc and resulting in a linear reading.

Figure 2:
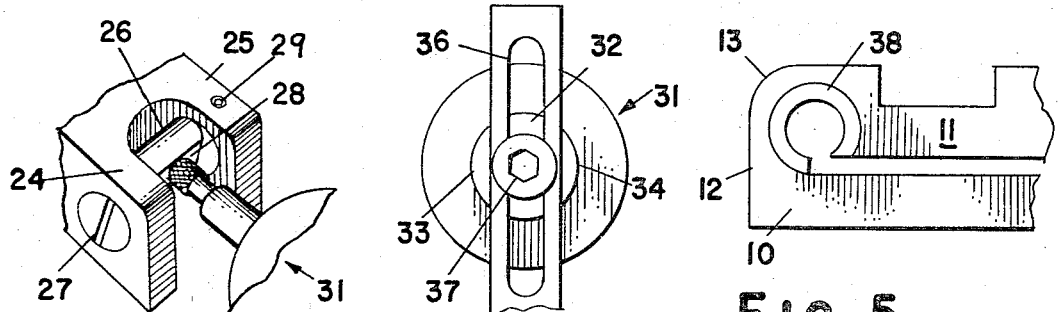
FIGURE 2 is a top view of the force gauge shown in FIGURE 1.

As will be clearly evident from the views of FIGURES 1 and 2, the instrument is readily adaptable towards applications of force measurements in which the gauge is positioned on a flat surface and compression loads are to be measured. In other words, without the clevises 17 and 19, the gauge may be rested on a table top and a force applied on the surface 15 which will cause movement of the upper member 11 about the pivot point 13 of the looped portion 12 towards the base member 14. In view of the horizontal disposition of the indicating means 31, the dial face thereof may be readily read from a position above the gauge. It will also be appreciated that by having the indicating means 31 in line, so to speak, with the upper member 11 that considerable space is conserved and the overall dimensions of the gauge may be held to a minimum. In other words, the probe 30 has its axis actually parallel to the members 11 and 10 rather than perpendicular as characterizes the more conventional constructions.

It will be noted that the looped portion 12 is formed substantially in the upper member 11 thereby assuring movement thereof rather than base member 10. In consequence, the base member 10 may be used for mounting the indicator 31 (through extension 35) without the possibility of error because of movement of member 10.

Figures 6, 7:
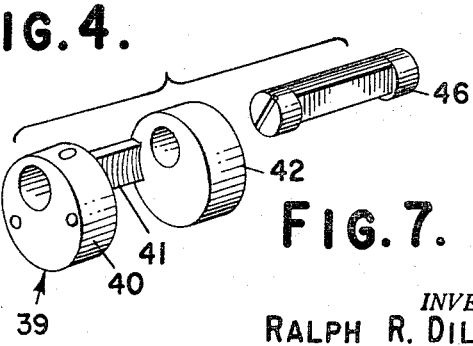
FIGURE 6 illustrates a further modification to the force gauge of the present invention for varying the capacity and sensitivity thereof; and, FIGURE 7 shows in exploded form the particular means for varying the capacity and sensitivity of the force gauge as shown assembled in FIGURE 6.

Certain variations in the sensitivity and capacity of the gauge may be achieved by the modifications as set forth in FIGURES 5, 6, and 7.

Thus, in FIGURE 5, there is shown a split sleeve adapter or insert 33 which may be inserted in the looped portion 12 to increase the capacity of the unit. In other words, with the sleeve or insert 38 provided in the looped portion 12, it will be appreciated that a greater force must be exerted since the stiffness of the sleeve 38 as well as the resilient force in the members 10 and 11 must be overcome. By increasing or decreasing the thickness of the sleeve 38, the capacity of the unit may be varied. Such a structure is also shown in applicant's co-pending application. Ser. No. 207,644, filed July 5, 1962, entitled Mechanical Force Gauge.

In FIGURES 6 and 7 is shown a construction wherein the anvil is somewhat differently constructed such that both capacity and sensitivity of the gauge may be varied at this one point. Thus, there is shown in FIGURE 6 an eccentric 39 embodying an end bearing 40, connecting portion 41, and another end bearing 42. One of the bearing members 40, for example, extends beyond the sidewall of the ear and may be provided with tool receiving openings 43 for rotating same. A set screw 44 may be provided to extend through the bearing 40 to an inner eccentrically located opening. Another set screw 45 may be provided for extending through the ear to tighten against the bearing portion 42.

Received within the bearing members 40 and 42 is an anvil 46, similar to the anvil 26 described heretofore, which is locked in position by the set screw 44.

With such a construction, the eccentric unit 39 may be rotated by the tool holes 43 to a position 39a, for example, such that the anvil 46 will have its forwardmost area moved from a point P to a point $P_1$. Thereafter, the anvil 46, as such, may be adjusted by a screw driver in the same manner as the anvil 26. The set screw may be tightened to secure the anvil 46 into position while the set screw 45 may be tightened to secure the eccentric 39 as a whole in position.

With such a construction, the capacity of the unit may be varied directly by adjustment of the rotative position of the eccentric unit 39 by loosening and tightening the set screw 45. Thereafter, the more precise sensitivity of the unit may be varied by loosening and tightening the set screw 44 and rotating the anvil 46 disposed therein.

From the foregoing, it will be seen that the improved force gauge according to the present invention provides a simple and rugged construction for conveniently measuring both tensile and compression forces of the type exemplified by electrodes of a spot welder, for example. It will also be seen that the force gauge of the present invention may be embodied in a relatively small overall dimension, and that it may be readily adjusted and/or modified to accommodate a wide range of capacities as well as made more accurate to enable very precise load measurements. Furthermore, by proper dimensioning, it may be readily designed for manual carrying from place to place and for shipping either in a completely assembled form or with the indicating unit separate therefrom.

Although the preferred embodiment has been illustrated and described, it will be appreciated that various modifications and changes may be made to the improved mechanical force gauge of the present invention without departing from the spirit and scope thereof as set forth in the following claims.

What is claimed is:

1. A force gauge comprising: an integral U-shaped resilient member defining a looped portion and spaced upper and lower members having free ends, said looped portion being formed substantially within one of said upper and lower members; force engaging surfaces provided near said looped portions such that opposing forces imposed thereon will cause the free end of said one of said members to move laterally relative to the other of said free ends; an integral extension extending from said other of said members, said integral extension including a longitudinal slot parallel to said free ends; indicator means slidable along said slot and including securing means to enable said indicating means to be secured to said extension at a selected longitudinal point, said indicator means having a probe with its axis substantially parallel to said free ends and slot; and, anvil means coupled to the free end of said one of said members for movement therewith, said anvil means being designed to engage said probe and cause axial movement thereof.

2. A force gauge comprising: an integral U-shaped resilient member defining a looped portion and spaced upper and lower members having free ends; force engaging surfaces provided near said looped portion such that opposing forces imposed thereon will cause at least one of said free ends to move laterally relative to the other; indicator means coupled to said lower member, said indicator means having a probe with its axis substantially parallel to said free ends, said free end of said upper member being bifurcated to define opposing ears; an anvil member mounted in said free end between said ears, said anvil member having a cam surface canted for engagement with said probe, whereby said probe is caused to move logitudinally in response to lateral movement of said one of said free ends because of the angle of said cam surface; and, means for adjusting the longitudinal disposition of said anvil relative to said probe, a bearing member mounted in said bifurcated ends, said anvil member being mounted in said bearing member eccentrically such that rotation of said bearing member will change the longitudinal disposition of said anvil member.

References Cited

UNITED STATES PATENTS

| | | | |
|---|---|---|---|
| 2,833,145 | 5/1958 | McCullough | 73—144 |
| 2,912,657 | 11/1959 | Schaevitz | 73—517 |
| 2,922,632 | 1/1960 | Bondra et al. | 73—517 |

RICHARD C. QUEISSER, *Primary Examiner.*

JAMES J. GILL, *Examiner.*

J. H. WILLIAMSON, *Assistant Examiner.*